(12) United States Patent
Nirei (10) Patent No.: US 8,931,912 B2
(45) Date of Patent: Jan. 13, 2015

(54) DISPLAY ILLUMINATION STRUCTURE

(71) Applicant: Calsonic Kansei Corporation, Saitama (JP)

(72) Inventor: Tsuyoshi Nirei, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 71 days.

(21) Appl. No.: 13/900,014

(22) Filed: May 22, 2013

(65) Prior Publication Data
US 2013/0314901 A1 Nov. 28, 2013

(30) Foreign Application Priority Data
May 24, 2012 (JP) .................................. 2012-118673

(51) Int. Cl.
| | |
|---|---|
| *G02B 6/00* | (2006.01) |
| *F21V 8/00* | (2006.01) |
| *B60K 37/02* | (2006.01) |
| *G01D 13/20* | (2006.01) |
| *G01D 11/28* | (2006.01) |

(52) U.S. Cl.
CPC ............. *G02B 6/0001* (2013.01); *B60K 37/02* (2013.01); *G01D 13/20* (2013.01); *G01D 11/28* (2013.01); *B60K 2350/203* (2013.01); *B60K 2350/206* (2013.01)
USPC ...................................................... 362/97.1

(58) Field of Classification Search
CPC ..... F21V 2008/00; F21V 7/00; F21V 7/0025; B60K 37/02; B60K 2350/203; B60K 2350/206; G01D 11/28; G01D 13/20; G02B 6/0001; B60Q 3/044; B60Q 3/022; G02F 1/1335; G02F 1/1336; G02F 1/133615
See application file for complete search history.

(56) References Cited

U.S. PATENT DOCUMENTS

| | | | | |
|---|---|---|---|---|
| 6,880,945 | B2 * | 4/2005 | Knaack et al. | 362/26 |
| 8,016,441 | B2 * | 9/2011 | Birman et al. | 362/26 |
| 8,764,208 | B2 * | 7/2014 | Tomono et al. | 362/23.11 |
| 8,840,260 | B2 * | 9/2014 | Nirei | 362/23.07 |

(Continued)

FOREIGN PATENT DOCUMENTS

| | | |
|---|---|---|
| DE | 102007025110 A1 | 1/2008 |
| EP | 1055916 A2 | 11/2000 |
| JP | 2011-47790 A | 3/2011 |

OTHER PUBLICATIONS

European Search Report for European Patent App. No. 13168497.9 (Sep. 2, 2013).

*Primary Examiner* — Bao Q Truong
(74) *Attorney, Agent, or Firm* — Kenealy Vaidya LLP (57) ABSTRACT

A display illumination structure includes: a display including a gauge portion; a light source; a light guiding member including an incident portion, a horizontally extending portion configured to guide the light emanating from the light source along the gauge portion, and an interior reflecting bent portion configured to reflect the light that enters from the incident portion towards the horizontally extending portion; and a housing including a main reflecting surface configured to reflect light that exits from the light guiding member so as to be returned to the light guiding member, and an auxiliary reflecting surface configured to reflect light that is not incident on the incident portion and light that leaks from a halfway portion of the light guiding member towards a low-luminance poorly illuminated portion being formed in a position on the gauge portion which lies closer to the light source.

4 Claims, 5 Drawing Sheets

(56) References Cited

U.S. PATENT DOCUMENTS

2009/0316382 A1 12/2009 Birman et al.
2011/0051393 A1* 3/2011 Ishikawa et al. ............... 362/29
2013/0010452 A1* 1/2013 Nirei ........................ 362/23.19

* cited by examiner

DISPLAY ILLUMINATION STRUCTURE

BACKGROUND

1. Field of the Invention

The present invention relates to a display illumination structure.

2. Description of the Related Art

An instrument panel is disposed at a front portion of a passenger compartment in a vehicle such as a motor vehicle. Instruments that display vehicle speed, engine speed and other driver information are provided in portions of the instrument panel which are situated in front of a driver's seat and between the driver's seat and a front passenger's seat (for example, refer to JP-A-2011-47790).

These instruments are equipped with displays for displaying the aforesaid various types of driver information, and these displays can be illuminated.

Figure 5:
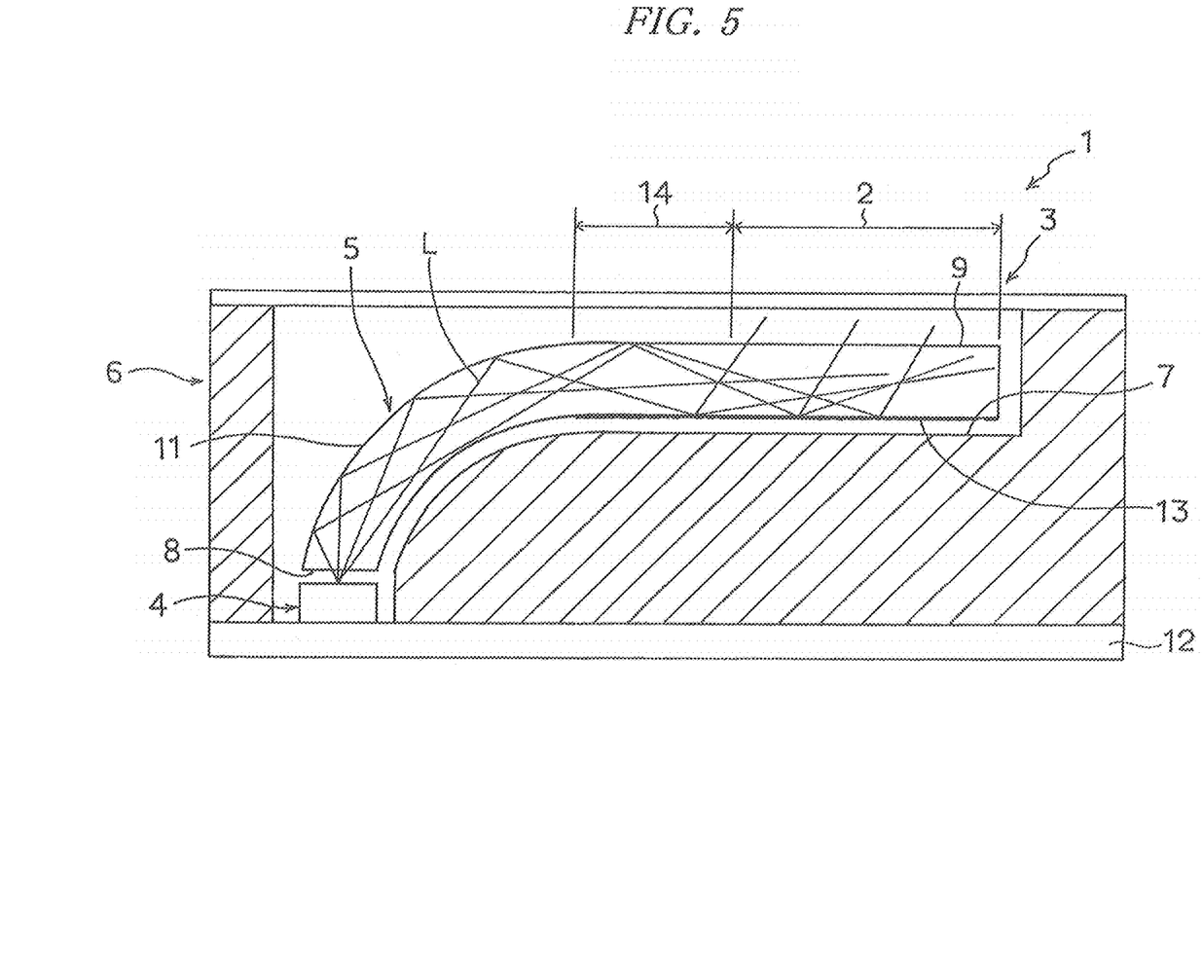
FIG. 5 is a vertical sectional view of a conventional display illumination structure.

FIG. 5 shows a sectional view of an instrument system 1 like those described above. This instrument system 1 includes a display 3 having a translucent lighting type gauge portion 2 (not shown in detail) which can be backlit. Additionally, a light source 4 is provided on a back surface side of the display 3. Further, a light guiding member 5 is provided which guides light L emanating from the light source 4 to at least a back surface side of the gauge portion 2 of the display 3.

The display 3 is disposed on a front surface side of a housing 6. Additionally, the light source 4 and the light guiding member 5 are disposed and accommodated in an interior of the housing 6. The housing 6 has on an inner surface thereof a reflecting surface 7 which reflects the light L that exits from the light guiding member 5 so as to be returned to the light guiding member 5.

Additionally, the light guiding member 5 has at least an incident portion 8 on which light L emanating from the light source 4 is incident and a horizontally extending portion 9 which guides the light L emanating from the light source 4 along the gauge portion 2 of the display 3 and further has an interior reflecting bent portion 11 which reflects the light L that enters from, the incident portion 8 towards the horizontally extending portion 9.

It should be noted that the light source 4 is mounted on a substrate 12 which is placed on a back surface side of the housing 6. Additionally, an embossed, fine irregular or micro-dot illumination adjusting portion 13 is formed on a back surface side of the light guiding member 5 (or at least the horizontally extending portion 9 thereof) to reflect or diffuse part of the light L guided into an interior of the light guiding member 5 so as to intensify the illumination at part of the gauge portion 2.

According to this configuration, the following advantage can be obtained.

Namely, the light L emanating from the light source 4 enters the interior of the light guiding member 5 from the incident portion 8. The light L that has entered the light guiding member 5 is reflected by the interior reflecting bent portion 11 in the interior of the light guiding member 5 and is then guided to the horizontally extending portion 9. The light L that has been guided to the horizontally extending portion 9 is guided towards a distal end portion of the horizontally extending portion while being reflected on the reflecting surface 7 formed on the housing 6, and part thereof is reflected or diffused at the illumination adjusting portion 13 for use in illuminating the gauge portion 2 of the display 3.

However, the display illumination structure has the following problems.

Namely, the interior reflecting bent portion 11 of the light guiding member 5 is configured so that the light L is bent by the reflecting surface having a reflection angle (a critical angle) at which the light L is totally reflected and formed on an outer circumferential surface side or an upper surface side, as seen in the figure, of the horizontally extending portion 9 so that the light L is allowed to reach a distal end of the horizontally extending portion 9. This makes it difficult for the light L to reach near the light source 4, causing the tendency to produce a low-luminance poorly illuminated portion 14 in a position on the gauge portion 2 which lies closer to the light source 4 or the like.

In this way, when the low-luminance poorly illuminated portion 14 is produced in the position on the gauge portion 2 which lies closer to the light source 4 or the like, the gauge portion 2 cannot be provided so as to extend as near as the light source 4, this causing problems that the range where the gauge portion 2 can be placed gets narrow and that the degree of freedom in designing the display 3 gets small.

SUMMARY

According to an aspect of the invention, there is provided a display illumination structure including: a display including a gauge portion being backlit; a light source which is disposed on a back surface side of the display; a light guiding member configured to guide light emanating from the light source to at least a back surface side of the gauge portion, the light guiding member including: an incident portion on which the light emanating from the light source is incident; a horizontally extending portion configured to guide the light emanating from the light source along the gauge portion; and an interior reflecting bent portion configured to reflect the light that enters from the incident portion towards the horizontally extending portion; and a housing on a front surface side of which the display is provided, in an interior of which the light source and the light guiding member are disposed, the housing including: a main reflecting surface, provided on an inner surface of the housing, configured to reflect light that exits from the light guiding member so as to be returned to the light guiding member; and an auxiliary reflecting surface, provided on the inner surface of the housing in a position which lies closer to the light source, configured to reflect light that is not incident on the incident portion and light that leaks from a halfway portion of the light guiding member towards a low-luminance poorly illuminated portion, the low-luminance poorly illuminated portion being formed in a position on the gauge portion which lies closer to the light source.

In the aspect of the invention, the auxiliary reflecting surface may be provided on a back side of the low-luminance poorly illuminated portion, and
the auxiliary reflecting surface may include a concavely recessed light collecting portion configured to collect light towards the low-luminance portion.

In the aspect of the invention, the auxiliary reflecting surface may be provided in at least one or more locations between near the light source and near a boundary portion between the horizontally extending portion and the interior reflecting bent portion.

In the aspect of the invention, an end portion of the auxiliary reflecting surface which lies closer to the light source may be formed in a position which lies closer to a mounting base portion than a light emitting portion of the light source.

According to the first aspect of the invention, the following working effects can be obtained by the configuration provided thereby. Namely, the light emanating from the light source enters the interior of the light guiding member from the incident portion. The light that has entered the light guiding member is reflected by the interior reflecting bent portion in the interior of the light guiding member and is then guided to the horizontally extending portion. The light guided to the horizontally extending portion is guided towards the distal end of the horizontally extending portion or is used to illuminate the gauge portion of the display while being reflected by the main reflecting surface formed on the housing.

As this occurs, the interior reflecting bent portion of the light guiding member is made to bend the light by using the reflection angle (the critical angle) at which the light is reflected totally in order to cause the light to reach as far as the distal end of the horizontally extending portion. This makes it difficult for the light to reach near the light source, causing the tendency that the low-luminance poorly illuminated portion is produced in the position on the gauge portion which lies closer to the light source.

To cope with this, the auxiliary reflecting surface is provided in the position on the inner surface of the housing which lies closer to the light source so as to reflect light that is not incident on the incident portion and light that leaks from the halfway portion of the light guiding member towards the low-luminance poorly illuminated portion on the gauge portion. Thus, the low-luminance poorly illuminated portion on the gauge portion can be illuminated brightly (the reduction in luminance can be improved or mitigated) by making use of the light out of the light guiding member that has not been used for illumination, thereby making it possible to increase the illumination efficiency.

As a result, it becomes possible to illuminate uniformly the whole of the range where the gauge portion is provided. Additionally, it becomes possible to expand the range where the gauge portion is provided towards the light source. Thus, it becomes possible to increase the degree of freedom in designing the display.

According to the second aspect of the invention, the following working effects can be obtained by the configuration provided thereby. Namely, the auxiliary reflecting surface is provided on the back side of the low-luminance poorly illuminated portion of the gauge portion, whereby the non-incident light that travels around the incident portion to the back side of the low-luminance poorly illuminated portion on the gauge portion and the light that leaks from the light guiding member can be collected towards the low-luminance poorly illuminated portion with good efficiency.

In addition, the auxiliary reflecting surface has the concavely recessed light collecting portion which collects light towards the low-luminance poorly illuminated portion, whereby a slight amount of non-incident light that travels around the incident portion to the back side of the low-luminance poorly illuminated portion and the light that leaks from the light guiding member are collected towards the low-luminance poorly illuminated portion with good efficiency, thereby making it possible to improve the reduction in luminance at the low-luminance poorly illuminated portion.

According to the third aspect of the invention, the following working effects can be obtained by the configuration provided thereby. Namely, the auxiliary reflecting surface is provided in at least one or more locations between near the light source and near the boundary portion between the horizontally extending portion and the interior reflecting bent portion, whereby the auxiliary reflecting surface can be provided in an ensured fashion for the position lying closer to the light source where a low-luminance poorly illuminated portion like the low-luminance poorly illuminated portion on the gauge portion is most likely to be produced (the portion in the predetermined range starting from the interior reflecting bent portion). By doing so, the low-luminance poorly illuminated portion is prevented from occurring in the position on the gauge portion which lies closer to the light source. Thus, it is possible to expand the gauge portion as far as near the light source by expanding the range where the gauge portion of the display can be provided. Consequently, it is possible to increase the degree of freedom in designing the display further.

According to the fourth aspect of the invention, the following working effect can be obtained by the configuration provided thereby. Namely, the light source side end portion of the auxiliary reflecting surface is formed in the position which lies closer to the mounting base portion than the light emitting portion of the light source, whereby almost the whole of light that is not incident in the incident portion is collected to the auxiliary reflecting surface efficiently so as to reflect it towards the low-luminance poorly illuminated portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

An instrument panel (or an interior panel at a front portion of a passenger compartment that is called a dashboard) is disposed at the front portion of the passenger compartment of a vehicle such as a motor vehicle. Instruments displaying vehicle speed, engine speed and other driver information are provided in portions of the instrument panel which lie in front of a driver's seat and between the driver's seat and a front passenger's seat.

These instruments are equipped with displays for displaying the aforesaid various types of driver information, and these displays can be illuminated. The invention relates to a display illumination structure for the displays described above.

Hereinafter, an embodiment of the invention will be described in detail by using the drawings.

FIGS. 1 to 4 show the embodiment and a modified example made thereto.

Hereinafter, the configuration of a display illumination structure will be described.

Figure 1:
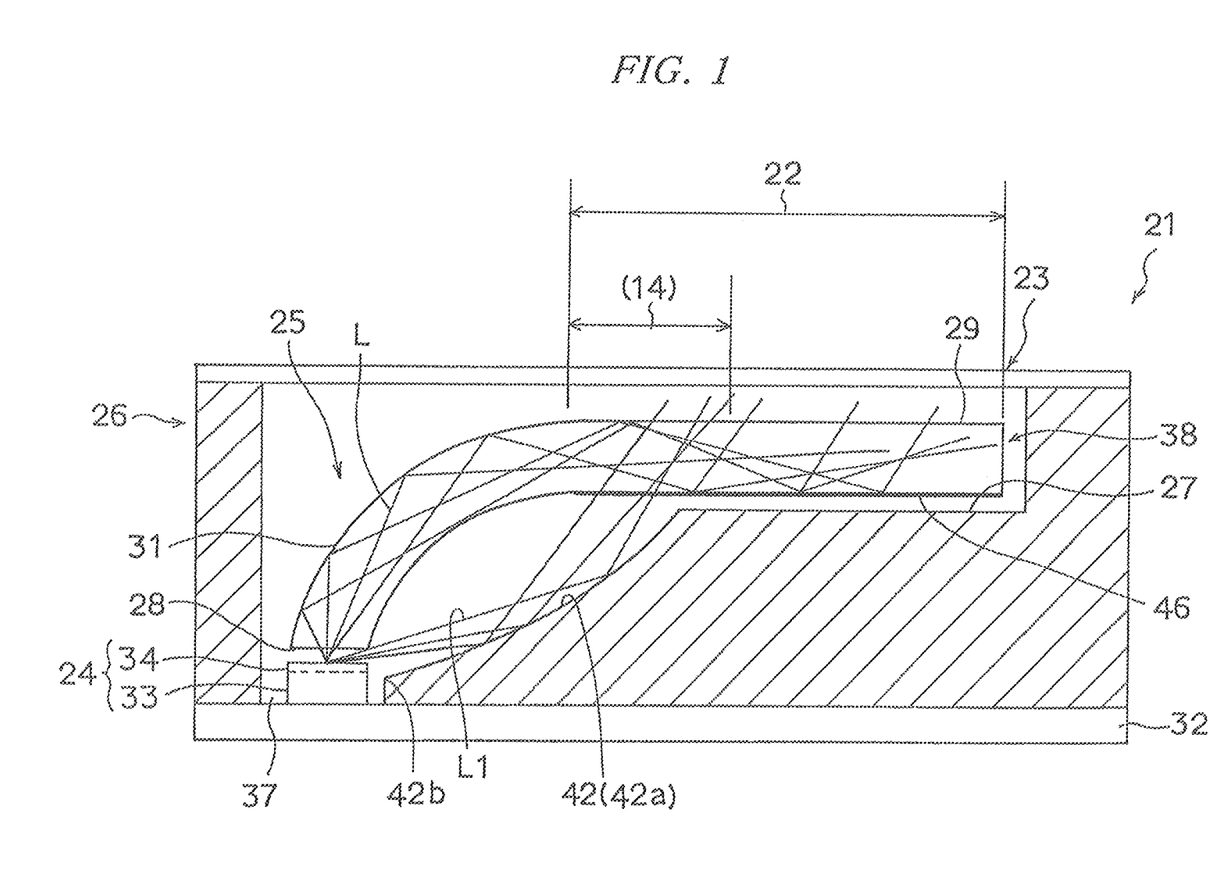
FIG. 1 is a vertical sectional view of a display illumination structure according to an embodiment of the invention.

Firstly, FIG. 1 is a vertical sectional view of an instrument system 21, and this instrument system 21 includes a display 23 having a translucent lighting type gauge portion 22 (not illustrated in detail) which can backlit. A light source 24 is provided on a back surface side of the display 23. Additionally, a light guiding member 25 is provided which guides light L emanating from the light source 24 to at least a back surface side of the gauge portion 22 of the display 23.

The display 23 is provided on a front surface side of a housing 26. Additionally, the light source 24 and the light guiding member 25 are accommodated and disposed in an interior of the housing 26. Further, the housing 26 has on an inner surface thereof a reflecting surface (a main reflecting surface 27) which reflects the light L that exits from the light guiding member 25 so as to be returned to the light guiding member 25.

The light guiding member 25 has at least an incident portion 28 (an incident surface) on which the light L emanating from the light source 24 is incident and a horizontally extending portion 29 which guides the light L emanating from the light source 24 along the gauge portion 22 of the display 23. Further, the light guiding member 25 has an interior reflecting bent portion 31 which reflects the light L that enters from the incident portion 23 towards the horizontally extending portion 29.

Here, the aforesaid "display 23" is formed of a transparent resin film or the like. A printed layer that transmits no light is formed on a front surface side or a back surface side of the display 23.

The aforesaid "gauge portion 22" includes a scale portion and a numeric value indicator portion which are formed along a needle movable region (or a needle rotatable region) of the display 23. The gauge portion 22 is provided as a translucent lighting type portion which can be backlit by forming the printed layer that transmits no light on the display 23 excluding a portion where the gauge portion 22 is to be formed. A translucent printed layer or the like may be provided at the gauge portion 22.

An LSD or the like is used for the aforesaid "light source 24." This light source 24 is mounted on a substrate 32 that is provided on a back surface side of the housing 26. This substrate 32 is provided on the housing 26 so as to be placed substantially parallel to the display 23. As this occurs, the light source 24 is mounted so that an optical axis thereof is at right angles to the display 23. The light source 24 has a mounting base portion 33 which is mounted on the substrate 32 and a light emitting portion 34 which is provided at a distal end portion of the mounting base portion 33.

The aforesaid "light guiding member 25" is made of a transparent resin. For example, resin such as acryl or polycarbonate is used for the light guiding member 25.

The aforesaid "housing 26" has a display mounting portion, not shown, which is used to mount the display 23 on the front surface side thereof. Additionally, the housing 26 has a substrate mounting portion, not shown, which is used to mount the substrate 32 on the back surface side thereof. In addition, the housing 26 has a light source inserting portion 37 which is used to insert and dispose the light source 24 mounted on the substrate 32 in an interior thereof. This light source inserting portion 37 is, for example, a through hole or a cutout formed in the housing 26.

The aforesaid "main reflecting surface 27" is formed in an interior of a recessed light guiding member accommodating portion 38 which is formed in the interior of the housing 26. When the light guiding member 25 is accommodated and placed in the interior of the light guiding member accommodating portion 38, a back surface of the light guiding member 25 is disposed apart from a bottom surface of the light guiding member accommodating portion 38 with a slight gap defined therebetween. In addition, a side surface of the light guiding member 25 is disposed apart from a side surface of the light guiding member accommodating portion 38 with a slight gap defined therebetween. However, the back surface of the light guiding member 25 may be brought into surface contact with the bottom surface of the light guiding member accommodating portion 38. Additionally, the side surface of the light guiding member 25 may be brought into surface contact with the side surface of the light guiding member accommodating portion 38. The housing 26 is formed from a white resin with a view to enhancing the reflectance factor of the light L on the main reflecting surface 27.

The aforesaid "incident portion 28" is provided on a surface of the light guiding member 25 which oppositely faces the light source 24. In particular, this incident portion 28 is provided at an end portion of the light guiding member 25. The incident portion 28 is provided so as to have a surface which is substantially parallel to the display 23 on at least part thereof.

The aforesaid "horizontally extending portion 29" is provided along a back surface side of the gauge portion 22 in a position on the light guiding member 25 which lies horizontally away from the light source 24. This horizontally extending portion 29 is provided substantially parallel to the display 23. A surface of a side of the horizontally extending portion 29 which lies to face the display 23 is made into a light emitting portion for illuminating the display 23 (or the gauge portion 22 thereof). A slight gap is defined between the light emitting portion and the display 23. However, the light emitting portion may be brought into surface contact with the display 23.

The aforesaid "interior reflecting bent portion 31" is provided between the incident portion 28 and the horizontally extending portion 29. This interior reflecting bent portion 31 is a bent portion which is intended to bend the overall traveling direction of the light L emanating from the light source 24 through 90 degrees from a direction normal to the display 23 (at a portion facing the incident portion 28) to a direction parallel to the display 23 (at a portion facing the horizontally extending portion 29). This interior reflecting bent portion 31 is made into a bent portion having a reflecting surface having a reflection angle (a critical angle) at which the light L is totally reflected and formed on an outer circumferential surface side or an upper surface side, as seen in the figure, of the interior reflecting bent portion 31.

The display illumination structure according to this embodiment includes the following configurations, in addition to the basic configuration that has been described heretofore.

In a first configuration, an auxiliary reflecting surface 42 is provided on the inner surface of the housing 26. This auxiliary reflecting surface 42 is intended to reflect light L1 that is not incident on the incident portion 28 (non-incident light) and light L2 that leaks from a halfway portion of the light guiding member 25 (leaky light, not shown particularly) towards a low-luminance poorly illuminated portion 14 that is formed in a position on the gauge portion 22 which lies closer to the light source 24 as describe in relation to FIG. 5.

Here, the aforesaid "light L1 that is not incident on the incident portion 28" means literally light L1 which is not incident on the incident portion 28 due to being emitted in a horizontal direction from the light, source 24.

The aforesaid "light L2 that leaks from a halfway portion of the light guiding member 25" denotes light L2 that leaks mainly from a halfway portion on a back surface side of the interior reflecting bent portion 31. However, the interior reflecting bent portion 31 of the light guiding member 25 is formed into the shape which guides the light L as far as possible as described above, and therefore, the amount of light L2 that leaks from the interior reflecting bent portion 31 is not much.

The aforesaid "low-luminance portion 14" means literally a portion on the gauge portion 22 which lies closer to the light source 24 and where the luminance of illumination is partially decreased. This low-luminance portion 14 is produced mainly on the periphery of a boundary portion between the horizontally extending portion 29 and the interior reflecting bent portion 31 of the light guiding member 25 (in particular, on a side of the horizontally extending portion 29).

This low-luminance portion 14 includes low-luminance portions ranging from a low-luminance portion which is so luminous as to be visible prominently to a low-luminance portion which is not luminous enough to be visible. However, basically, a low-luminance portion which is luminous enough to be visible somehow is meant by the low-luminance portion 14. Whether or not a portion in question constitutes the low-luminance portion 14 can be determined visually or by using a luminosity meter.

From the positional point of view, the aforesaid "auxiliary reflecting surface 42" may be provided on part (in an interior) of the main reflecting surface 27 (an interior auxiliary reflecting surface) or may be provided in a position lying out of (in an exterior of) the main reflecting surface 27 (an exterior auxiliary reflecting surface). Alternatively, the auxiliary reflecting surface 42 may be provided so as to extend between the interior and exterior of the main reflecting surface 27 in such a way that part of the auxiliary reflecting surface 42 is positioned in the interior of the main reflecting surface 27 while another part thereof is positioned in the exterior of the main reflecting surface 27. As this occurs, the auxiliary reflecting surface 42 is provided on the main reflecting surface 27 in a position which lies closer to the light source 24 so as to deform partially the main reflecting surface 27.

The auxiliary reflecting surface 42 may be given any shape, provided that the light L1 and the light L2 can be reflected towards the low-luminance poorly illuminated portion 14 of the gauge portion 22. However, the auxiliary reflecting surface 42 can be given a shape made up of a single flat surface or a single curved surface or a shape made up of a combination of pluralities of flat surfaces and curved surfaces. The flat surface can be made up of an inclined surface, for example. The curved surface can be made up, for example, of a three-dimensional surface such as a cylindrical surface, a spherical surface or a parabolic surface or other curved surfaces including a free curved surface. Additionally, the curved surface includes a surface which is made up of a plurality of small flat surfaces which are combined together at different angles so that the resulting surface approximates to a curved surface.

The auxiliary reflecting surface 42 is provided as a reflecting surface having a different function from that of the main reflecting surface 27. However, the auxiliary reflecting surface 42 and the main reflecting surface 27 may be disposed so as to overlap each other (partially) as described above.

In a second configuration, the auxiliary reflecting surface 42 is provided on a back side of the low-luminance poorly illuminated portion 14 on the gauge portion 22. Additionally, the auxiliary reflecting surface 42 has a concavely recessed light collecting portion 42a which collects the light L1 and the light L2 towards the low-luminance portion 14.

Here, it is preferable that the aforesaid "auxiliary reflecting surface 42" is provided so as to extend over a wider range than the low-luminance portion 14. However, in the case of the space being limited or the function of the main reflecting surface 27 being affected, the auxiliary reflecting surface 42 may be provided over a range equal to or smaller than the low-luminance portion 14.

Additionally, it is preferable that the auxiliary reflecting surface 42 is provided in a position lying directly behind the low-luminance portion 14. However, depending upon conditions, the auxiliary reflecting surface 42 can be provided in a position which deviates slightly towards the light source 24 or in an opposite direction thereto from the position lying directly behind the low-luminance portion 14.

Further, it is preferable that the auxiliary reflecting surface 42 is formed into a continuously smooth shape as a whole from the viewpoint of making the luminance on the periphery thereof uniform. For example, the concavely recessed light collecting portion 42a of the auxiliary reflecting surface 42 can be formed, for example, into a mortar-like shape. However, depending upon conditions, the auxiliary reflecting surface 42 may be formed into a shape which is partially not smooth.

The aforesaid "concavely recessed light collecting portion 42a" is provided on at least part of the auxiliary reflecting surface 42. When the concavely recessed light collecting portion 42a makes up part of the auxiliary reflecting surface 42, for example, the auxiliary reflecting surface 42 can divided into a portion which collects the light L1 and the light L2 towards the concavely recessed light collecting portion 42a and the concavely recessed light collecting portion 42a which reflects the light L1 and the light L2 which are collected at the portion above towards the low-luminance poorly illuminated portion 14 on the gauge portion 22. As this occurs, an arrangement can be adopted in which the concavely recessed light collecting portion 42a is disposed at the center and the portion which collects the light L1 and the light L2 towards the concavely recessed light collecting portion 42a is disposed so as to surround the concavely recessed light collecting portion 42a.

In a third configuration, the auxiliary reflecting surface 42 is provided in at least one or more locations between near the light source 24 and near the boundary portion between the horizontally extending portion 29 and the interior reflecting bent portion 31.

Here, when there exists a plurality of low-luminance poorly illuminated portions 14 on the gauge portion 22, a plurality of auxiliary reflecting surfaces 42 like the "auxiliary reflecting surface 42" may be provided accordingly.

When a low-luminance portion 14 like the low-luminance poorly illuminated portion 14 on the gauge portion 22 exits at an intermediate portion of the horizontally extending portion 29, from the structural point of view, it is possible to provide a similar auxiliary reflecting surface 42 in a position corresponding to the intermediate portion of the horizontally extending portion 29.

In a fourth configuration, an end portion 42b (an initiating end portion) of the aforesaid auxiliary reflecting surface 42 which lies closer to the light source 24 is formed in a position lying closer to the mounting base portion 33 than the light emitting portion 34 of the light source 24.

Here, the aforesaid "position lying closer to the mounting base portion 33" means a position which lies closer to the substrate 32 than a boundary between the light emitting portion 34 and the mounting base portion 33 in a vertical direction to the display 23.

Hereinafter, the function of this embodiment will be described.

Light L emanating from the light source 24 enters the interior of the light guiding member 25 from the incident portion 28. The light L that has entered the light guiding member 25 is reflected by the interior reflecting bent portion 31 in the interior of the light guiding member 25 and is then guided to the horizontally extending portion 29. The light L that has been guided to the horizontally extending portion 29 is guided towards a distal end of the horizontally extending portion 29 or is used to illuminate the gauge portion 22 while being reflected by the main reflecting surface 27 which is formed on the housing 26.

As this occurs, the interior reflecting bent portion 31 of the light guiding member 25 is made to bend the light L by using the reflection angle (the critical angle) at which the light L is totally reflected so that the light L is caused to reach the distal end of the horizontally extending portion 29. This makes it difficult to cause the light L to reach near the light source 24, causing the tendency that the low-luminance poorly illuminated portion 14 is produced in the position on the gauge portion 22 which lies closer to the light source 24 or the like.

According to the embodiment, there are provided the following advantages.

When the low-luminance poorly illuminated portion 14 is produced in the position on the gauge portion 22 which lies closer to the light source 24 or the like due to the configuration which makes it difficult to cause the light L from the light guiding member 25 to reach the position on the gauge portion 22 which lies closer to the light source 24 or the like, the auxiliary reflecting surface 42 is provided on the inner surface of the housing 26 in the position lying closer to the light source 24 so that the light L1 that is not incident on the incident portion 28 and the light L2 that leaks from the halfway portion of the light guiding member 25 are reflected towards the low-luminance poorly illuminated portion 14 on the gauge portion 22. By adopting this configuration, the low-luminance poorly illuminated portion 14 on the gauge portion 22 can be made bright (the reduction in luminance can be improved or mitigated) by making use of the light L1 and the light L2 that have not been used for illumination and which exist out of the light guiding member 25, thereby making it possible to enhance the illumination efficiency, as well.

As a result, it is possible to illuminate uniformly the whole of the region where the gauge portion 22 is provided. Additionally, it is possible to expand the region where the gauge portion 22 is provided towards the light source 24. Thus, it is possible to enhance the degree of freedom in design.

Further, the auxiliary reflecting surface 42 is provided on the back side of the low-luminance poorly illuminated portion 14 on the gauge portion 22, whereby non-incident light (the light L1) that travels around the incident portion 28 to the back side of the low-luminance poorly illuminated portion 14 on the gauge portion 22 and leaky light (the light L2) can be collected so as to be reflected towards the low-luminance portion 14 with good efficiency.

Additionally, the auxiliary reflecting surface 42 has the concavely recessed light collecting portion 42a which collects the light L1 and the light L2 towards the low-luminance portion 14, whereby the slight amount of non-incident light (the light L1) that travels around the incident portion 28 towards the back side of the low-luminance portion 14 and the leaky light (the light L2) can be collected towards the low-luminance portion 14 with good efficiency, thereby making it possible to improve the reduction in luminance of the low-luminance portion 14.

Further, the auxiliary reflecting surfaces 42 are provided in at least one or more locations between near the light source 24 and near the boundary portion between the horizontally extending portion 29 and the interior reflecting bent portion 31, whereby it is possible to provide the auxiliary reflecting surface 42 for the position on the gauge portion 22 which lies closer to the light source 24 and where the low-luminance poorly illuminated portion 14 is most likely to be produced (the portion extending over the predetermined range from the interior reflecting bent portion 31).

By adopting this configuration, the problem is solved that the low-luminance portion 14 in illumination is produced in the position on the gauge portion 22 which lies closer to the light source 24. Therefore, the range where the gauge portion 22 of the display 23 can be placed is expanded to such an extent that the gauge portion 22 can be set near the light source 24. Consequently, it is possible to enhance the degree of freedom in designing the display 23.

Further, the end portion 42b of the auxiliary reflecting surface 42 which lies closer to the light source 24 is formed in the position which lies closer to the mounting base portion 33 of the light source 24 than the light emitting portion 34 of the light source 24, whereby almost all the light L1 which is not incident on the incident portion 28 can be collected to the auxiliary reflecting surface 42 efficiently so as to be reflected towards the low-luminance portion 14.

Figure 2:
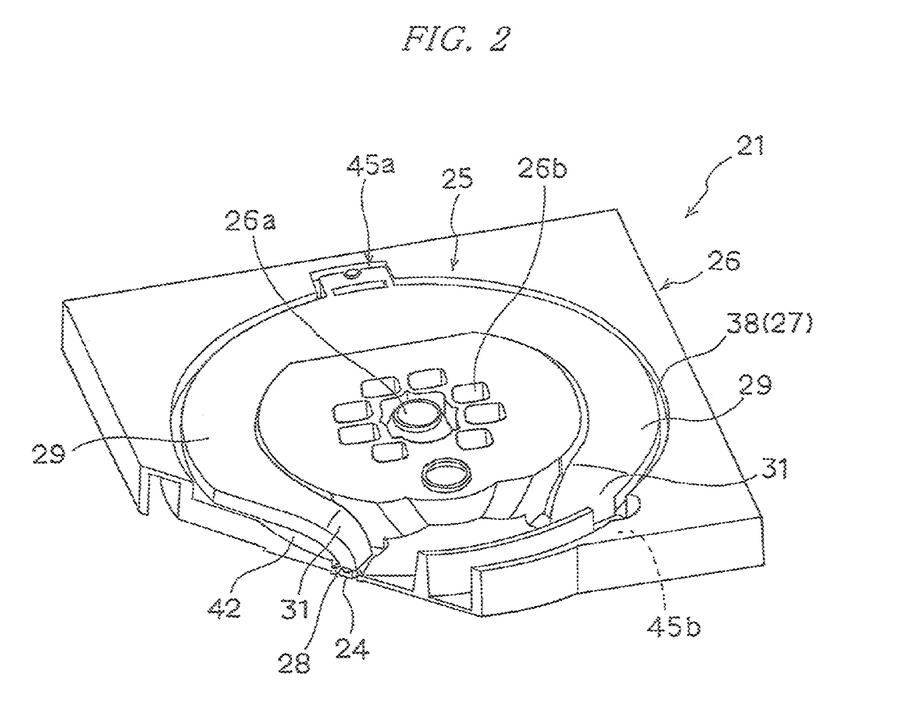
FIG. 2 is a partially cutaway perspective view showing the display illumination structure shown in FIG. 1 more specifically.
Figure 3:
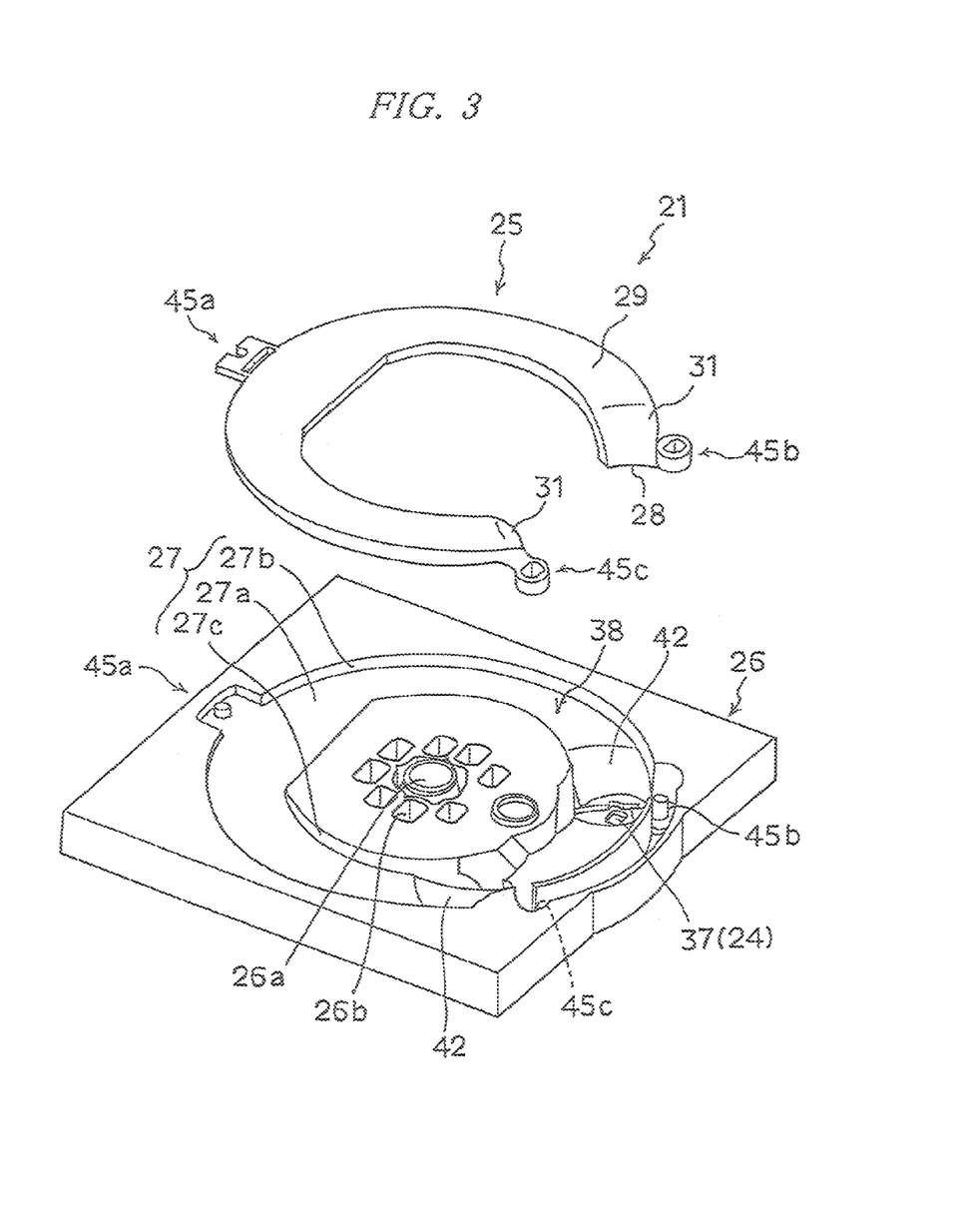
FIG. 3 is an exploded perspective view of the more specific display illumination structure shown in FIG. 2.

Hereinafter, referring to FIGS. 2 to 4, a specific example according to the embodiment will be described.

In a general instrument system 21, a partially circular (or a circular) needle swing region is formed on the "display 23 (not shown)." Additionally, a gauge portion 22 (not shown) is formed along a circumferential edge portion of the partially circular (or the circular) needle swing region over a narrower range than 360 degrees which excludes a lower portion of the partially circular needle swing region.

Additionally, a needle shaft is disposed in a central portion of the needle swing region on the display 23, and a needle is provided on a front surface side of the display 23 so as to extend in a radial direction of the needle swing region. The needle swings along the needle swing region about the needle shaft while kept almost parallel to the display 23.

The aforesaid "light guiding member 25" is formed into almost an arc shape which extends along the gauge portion 22. This almost arc-shaped light guiding member 25 has a widthwise dimension that is equal to or slightly wider than a radial width of the gauge portion 22.

Then, most of the light guiding member 25 is made into a horizontally extending portion 29, and an interior reflecting bent portion 31 and an incident portion 28 are provided at each end portion of the horizontally extending portion 29. Then, a light source 24 is provided in a position lying on a back surface side of each incident portion 28. From the viewpoint of space efficiency, it is preferable that the light sources 24 are provided within a circle which makes up the needle swing region.

The aforesaid "housing 26" has a light guiding member accommodating portion 38 which is formed into an arc-shaped groove which is almost similar in shape to the light guiding member 25. Then, the aforesaid "main reflecting surface 27" is formed on an inner surface of the light guiding member accommodating portion 38. Additionally, the main reflecting surface 27 has a bottom reflecting surface 27a which is formed on a bottom surface of the light guiding member accommodating portion 38, an outer circumferential side reflecting surface 27b which is formed on an outer circumferential side surface of the light guiding member accommodating portion 38 and an inner circumferential side reflecting surface 27c which is formed on an inner circumferential side surface of the light guiding member accommodating portion 38.

Further, a needle shaft hole 26a where the needle shaft is to be disposed in a penetrating fashion is formed in the housing 26. A plurality of light source accommodating portions 26b intended to illuminate various warning and guiding indicators are formed as required around the needle shaft hole 26a. The various warning and guiding indicators are formed on the display 23 in almost a similar way to the way in which the gauge portion 22 is formed.

Position regulating portions 45a to 45c for regulating the position of the light guiding member 25 relative to the housing 26 are provided between the housing 26 and the light guiding member 25. The position regulating portions 45a to 45c are made up of positioning pins which are provided on either of the housing 26 and the light guiding member 25 and pin receiving holes which are provided on the other. As this occurs, the position regulating portions 45a to 45c are provided in three locations: near a central portion (a top portion) along the length of the light guiding member 25 and near both end portions of the light guiding member 25. However, the number of position regulating portions 45a to 45c to be provided is not limited to three. Additionally, the positioning pins and the pin receiving portions may be provided on either of the housing 26 and the light guiding member 25. It should be noted that the position regulating portions 45a to 45c are provided in positions lying out of a light guiding portion (positions along an inner circumferential or outer circumferential side) of the light guiding member 25 so as not to interrupt the function of the light guiding member 25.

Figure 4:
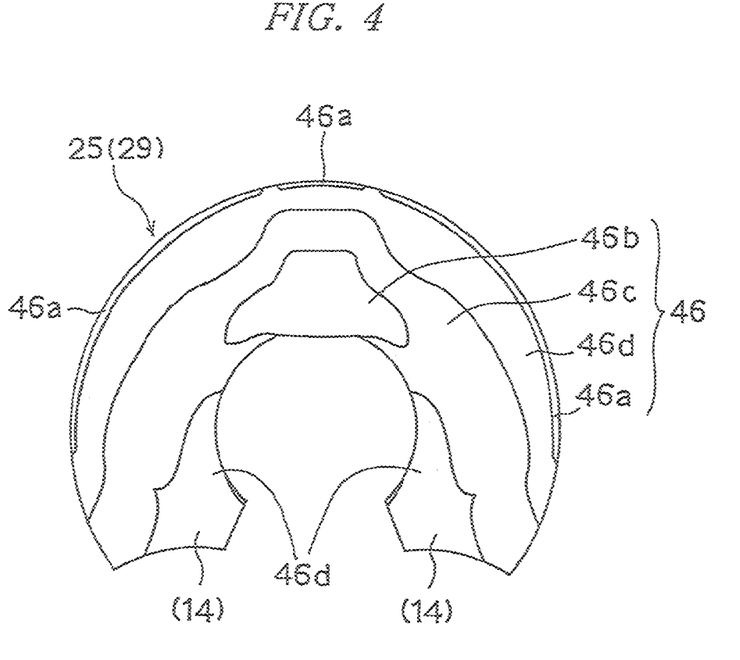
FIG. 4 is a plan view of a light guiding member shown in FIG. 2.

Additionally, as shown in FIG. 4, an illumination adjusting portion 46 is formed on a back surface side of the light guiding member 25 (or at least the horizontally extending portion 29 thereof). The illumination adjusting portion 46 has an embossed, finely irregular or microdot portion which is adapted to reflect and diffuse part of light L that is guided into an interior (of the horizontally extending portion 29) for partial enhancement of the illumination of the gauge portion 22. This illumination adjusting portion 46 is provided partially in order to enhance the illumination of the low-luminance portion. In addition, as the density of embosses, fine irregularities or microdots imparted to the surface of the illumination adjusting portion 46 increases, the illumination of the gauge portion 22 can be enhanced higher. The density of the illumination adjusting portion 46 is allowed to vary in multiple stages for adjustment of the brightness of the illumination of the gauge portion 22.

As this occurs, the illumination adjusting portion 46 is set and adjusted to make uniform the luminance at the gauge portion 22 by adjusting a variation in luminance between the low-luminance portion 14 and the other portion of the gauge portion 22.

More specifically, a portion of the illumination adjusting portion 46 where the density becomes lowest (a least dense portion 46a) is provided at an outer circumferential portion of the light guiding member 25. This is because the light L is guided most to the outer circumferential portion of the light guiding member 25.

Then, a portion of the illumination adjusting portion 46 where the density becomes highest (a most dense portion 46b) is provided in a position on an inner circumferential portion of the light guiding member 25 which lies farthest from the light source 24 (near the top portion of the light guiding member 25). This is because it becomes most difficult for the light L to reach the inner circumferential portion of the light guiding member 25, in particular, a position on an inner circumferential side of the top portion which lies farthest from the light source 24.

Further, a portion of the illumination adjusting portion 46 where the density becomes medium (a medium dense portion 46c) is provided at a portion that surrounds the periphery of the most dense portion 46b and which lies substantially in a widthwise central portion of the light guiding member 25.

Additionally, a portion of the illumination adjusting portion 46 that is less dense than the medium dense portion 46c and which has a reference density (a normal dense portion 46d) is provided at the remaining portion of the light guiding member 25.

In FIG. 4, the low-luminous state of portions where the low-luminance portion 14 described above is to be produced (which are denoted by a parenthesized reference numeral) is improved by providing the auxiliary reflecting surface 42, whereby those portions can be improved to the level of the normal dense portion 46d. It should be noted that a sufficient luminance cannot be obtained at these portions, even at the most dense portion 46b unless the auxiliary reflecting surface 42 is provided.

In addition to the auxiliary reflecting surface 42, the illumination adjusting portion 46 is provided which can adjust the luminance of illumination in the four stages, whereby the uniform luminance is attempted to be realized by causing them to work together in a cooperative fashion. Although the illumination adjusting portion 46 is described as adjusting the luminance of illumination in four stages, the invention is not limited thereto, and hence, the illumination adjusting portion 46 can be made to adjust the luminance of illumination in two states or the like.

Thus, while the embodiment of the invention has been described in detail based on the drawings, the embodiment illustrates only one example of the invention, and therefore, the invention is not limited to the configuration of the embodiment. Thus, the invention can, of course, be modified in design without departing from the spirit and scope of the invention, and the resulting embodiments or modified examples are to be included in the invention. Additionally, when a plurality of configurations are included in each embodiment, any possible combination of these configurations is, of course, to be included in the invention although no specific description is made to that respect. In addition, when a plurality of embodiments or modified examples are illustrated, any possible combination of the embodiments or modified examples out of the whole embodiments or modified examples is, of course, to be included in the invention although no specific description is made to that respect. Additionally, although no specific description is made to that respect, the configurations depicted in the drawings are, of course, to be included in the invention. Further, when words such as "or the like" are used, they are used to mean that like parts or members are included. In addition, when words such as "substantially," "about," "approximately" or the like are used, they are used to mean that ranges or accuracies which are admitted based on common sense are included.

What is claimed is:

1. A display illumination structure comprising:
a display including a gauge portion being backlit;
a light source which is disposed on a back surface side of the display;
a light guiding member configured to guide light emanating from the light source to at least a back surface side of the gauge portion, the light guiding member including:
an incident portion on which the light emanating from the light source is incident;
a horizontally extending portion configured to guide the light emanating from the light source along the gauge portion; and
an interior reflecting bent portion configured to reflect the light that enters from the incident portion towards the horizontally extending portion; and a housing on a front surface side of which the display is provided, in an interior of which the light source and the light guiding member are disposed, the housing including:

a main reflecting surface, provided on an inner surface of the housing, configured to reflect light that exits from the light guiding member so as to be returned to the light guiding member; and an auxiliary reflecting surface, provided on the inner surface of the housing in a position which lies closer to the light source, configured to reflect light that is not incident on the incident portion and light that leaks from a halfway portion of the light guiding member towards a low-luminance poorly illuminated portion, the low-luminance poorly illuminated portion being formed in a position on the gauge portion which lies closer to the light source.

2. The display illumination structure according to claim 1, wherein:

the auxiliary reflecting surface is provided on a back side of the low-luminance poorly illuminated portion; and the auxiliary reflecting surface includes a concavely recessed light collecting portion configured to collect light towards the low-luminance portion.

3. The display illumination structure according to claim 1, wherein the auxiliary reflecting surface is provided in at least one or more locations between near the light source and near a boundary portion between the horizontally extending portion and the interior reflecting bent portion.

4. The display illumination structure according to claim 1, wherein an end portion of the auxiliary reflecting surface which lies closer to the light source is formed in a position which lies closer to a mounting base portion than a light emitting portion of the light source.

* * * * *